Oct. 31, 1944.     F. H. WATSON     2,361,890
VALVE STEM
Filed Sept. 30, 1936
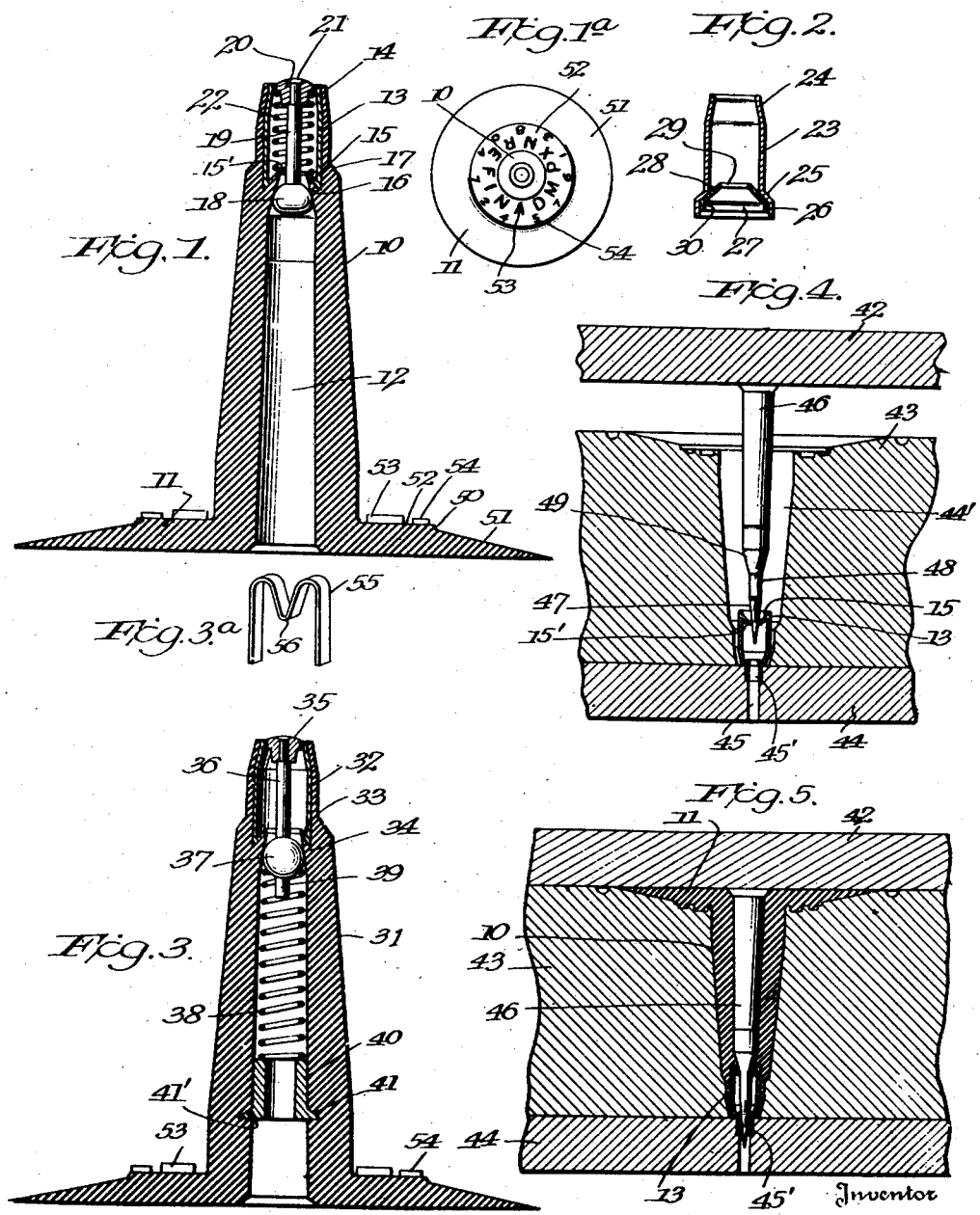
Inventor
Frank H. Watson,
By Cushman Darby Cushman
Attorneys Patented Oct. 31, 1944

2,361,890

UNITED STATES PATENT OFFICE 2,361,890

VALVE STEM

Frank H. Watson, Jonesboro, Ark., assignor to Jenkins Bros., Bridgeport, Conn., a corporation of New Jersey Application September 30, 1936, Serial No. 103,436

19 Claims. (Cl. 277—42)

The present invention relates to valve stems of rubber or like composition, and has as an object to produce a valve stem unit so designed as to eliminate any need for a cap, as now ordinarily provided. Another object is to provide a valve stem with a base portion so conformed as to facilitate venting when a tube to which the stem is attached is inflated in a casing. As an adjunct to the new stem I provide a clip which may be applied for the purpose of holding the valve unseated for the purpose of deflation.

In its preferred form the new stem includes at its tip a tubular insert, and heretofore considerable difficulty has been experienced in incorporating such inserts in molded bodies, since in the molding operation the moldable substance has been apt to be forced into the interior of the insert. I overcome this difficulty in accordance with the present invention by providing means whereby the insert definitely closes off that portion of the mold cavity which it occupies, so that no access of the plastic substance to the interior of the insert is possible. The invention also includes a special form of insert for rubber valve stems, the insert having characteristics particularly adapting it to the new molding operation.

The invention will be described with reference to the accompanying drawing in which Figure 1 is an axial section of a rubber valve stem embodying the features of the present invention, Figure 1a is a plan view of the valve stem on a reduced scale, Figure 2 is an axial section of a modified form of insert which may replace the form shown in Figure 1, Figure 3 is an axial section of a modified stem, Figure 3a shows in perspective a clip which may be applied to the tip of the stem for the purpose of holding the movable valve element unseated, Figure 4 is a cross-section through a mold and through an insert positioned in the mold cavity and intended for incorporation in a rubber stem, and Figure 5 shows the parts of Figure 1 at the end of the molding operation.

Referring first to Figure 1, reference numeral 10 designates an elongated rubber body, externally of generally tapered form from base to tip, an integral flap 11 being formed at the base of the body and serving for securing the stem to a tire or tube in the well-known manner. The body 10 is provided with an axial throughpassage 12, which, at its outer or tip end, is lined by an insert 13 of light metal. The inner portion of insert 13 is substantially cylindrical, as here shown, the outer end of the insert, at 14, being tapered so that the outer end opening of the insert is constricted as compared to its main inner portion. In other words the insert being flared from its tip toward the base of the stem, a restricted outer end opening and a subjacent outwardly tapered zone are provided. At its inner end the insert has an inner conical flange 15 which is pointed toward the tip of the stem, and this flange lies behind and surmounts an annular seat or constriction 16, substantially surrounding the same so as to back it against distention. The flange defines a circular opening 15', whose diameter, as here shown, is the same as the top diameter of the conical shoulder 16.

Above the seat 16 the body 10 is rather abruptly tapered, at 17, and is then continued with substantially equal thickness to the outer extremity of the insert, or the rubber may become thinner as the extremity is approached. The insert is securely joined to the body 10 during vulcanization of the latter and as shown it is entirely rubber-covered exteriorly.

The tip portion of the body is externally substantially cylindrical from shoulder 17 to a point about half way to its extremity and from the said point it has a substantial taper. The cylindrical portion is of a size to be engaged by the threads of an inflating coupling and this means that the threads will pass over the reduced or tapered portion, thus avoiding the possibility of mutilating the body extremity and of perhaps stripping it from the insert. Furthermore, the reduced portion is enabled to enter the coupling sufficiently to engage the usual washer and insure a tight connection. The coupling can only be screwed on the cylindrical portion for two or three turns before binding and consequently, without the reduced extremity, contact with the washer could not be made.

A valve body 18, freely movable in the passage 12 inwardly of shoulder 16 is adapted to seat against the shoulder in the vicinity of the backing flange 15 and is of such size as to be unable to pass upwardly through the opening 15'. A stem or pin 19, secured to the valve body 18, extends through to the outer end of insert 14, the outer extremity of the pin being reduced to form a shoulder and receiving a pierced head 20 which is secured to pin 19 by upsetting the latter as at 21. The outer end of head 20 is substantially circular in cross-section, and substantially fills the end opening of insert 13. The inner portion of the head is reduced to form a shoulder, against which bears one end of a yieldable means, here shown as a compression spring 22, the spring surrounding stem 19 and bearing with its other end against the outer surface of flange 15. The normal position of the parts is that shown in Figure 1, wherein valve body 18 is engaged with seat 16, due to the action of spring 22, so that flow through the stem from the base of the same is prevented. Head 20 sufficiently closes the end opening of insert 13 so as to prevent the access of foreign matter to the interior of the insert. In this manner the necessity for the provision of the usual cap is entirely eliminated. As a result, the stem is extremely convenient in use and its cost is less.

The sliding fit of the head 20 in the end opening of the insert 13 is such that not only are dirt particles kept out of the insert but water also can never enter the insert past the head as long as body 18 is in its normal seated position.

In the inflating operation, the air chuck is engaged with the tip of the stem and the chuck valve is tripped in the usual manner. The chuck pin or the air pressure forces the valve assembly 18, 19, 20 inwardly, so that air is free to flow between head 20 and the enlarged portion of the passage in the insert and between seat 16 and valve body 18.

The valve parts are assembled by inserting the valve body and pin through passage 12 to the position shown in Figure 1. Thereupon spring 22 is positioned and head 20 is secured in place, completing the operation.

The insert shown in Figure 1 may be replaced by that shown in Figure 2. In Figure 2 the insert has the cylindrical medial portion 23 and the tapered tip portion 24. At its base end the insert is outwardly flared at 25 and terminates in a cylindrical skirt 26. A fitting 27 has a conical flange 28 with a central opening 29, smaller than the valve body 18, and a cylindrical skirt 30. The latter is pressed into skirt 26 of the insert until it abuts the constricted base portion of the latter, as shown, being frictionally maintained in this position. The cup-like inner end portion of the insert like the flange 15 of the embodiment of Fig. 1 restrains the valve seat both laterally and upwardly as viewed in the drawing.

Both forms of insert may be readily produced by automatic machines from light tube stock or sheet metal.

In Figure 3 the stem body 31 and insert 32 are generally similar to those described above. In this case, however, the flange 33 is somewhat shallower and the seat 34 has correspondingly less overhang, this being for the purpose of permitting the head 35 to be passed through the seat and flange upon assembly of the movable valve parts with the stem body from the base of the latter. The point is that in the embodiment of Figure 3 it may be desired to insert the valve head 35, stem 36, and body 37, as a unit, from the base end of the stem, and the valve head and flange 33 must be proportioned accordingly. Unless the size of the valve head is reduced, as compared to the showing of Figure 1, the opening through flange 33 and seat 34 must be increased. The opening defined by the flange 33 is still smaller than the valve body 37 analogously as in the embodiments of Figs. 1 and 2.

When the valve unit has been introduced to the position shown in Figure 3, a compression spring 38 is inserted from the base of the stem, one end of the spring engaging valve body 37 and being centered, if necessary, by a stud 39 projecting from the latter, the other end of the spring resting on an abutment 40, likewise inserted from the base of the stem. The abutment 40 is a tubular member of about the size of the stem passage and has a sharp flange 41 which bites into the passage walls to hold the abutment securely in place. If desired, the stem passage may be provided in the molding operation with a groove 41' for the reception of flange 41 which is preferably circumferential. The groove serves to position the abutment 40 at the proper point in the passage when it is inserted, thus facilitating assembly and assuring uniformity of compression of the springs. The groove 41' may be readily produced by providing the usual mold pin with a flange at the proper point.

The spring and abutment arrangement described with reference to Figure 3 can, of course, be used equally well in connection with the embodiment shown in Figure 1, omitting spring 22 of the latter.

The radially expanded flange or flap 11, as shown, is of substantially even thickness out to a concentric shoulder 50 from which it is tapered to its outer circular edge. The shoulder 50 is of a depth substantially equal to the wall thickness of an inner tube and the stem may be applied to a tube with the outer portion 51 within the tube and the edges of the tube opening embracing the shoulder 50, the tube being substantially flush with inner portion 52 of the flap. Or the bottom of the flap may be applied to the outside of the tube in the manner now customary. In the latter case extra covering may be provided up to shoulder 50.

On portion 52 of the flap, Figures 1, 1a and 3, is formed a concentrically arranged series of spaced apart characters or protuberances 53 of substantial height and outwardly of these is another similarly arranged series 54 of which the constituents may be of less height than the first. For example, the characters 53 may be letters forming the name of the manufacturer or a trademark name and the characters 54 may be the patent marking. In any event, when the tube, in a casing, is applied to a wheel rim, the protuberances keep the flap from sealing against the rim around the rim opening so as to trap air entrained between the tube and the casing. Such entrained air is enabled to escape readily between the protuberances to the rim opening.

The clip 55 is preferably made from a strip of spring steel and is substantially M-shaped. The clip is applied by forcing its legs downwardly into engagement with the cylindrical portion of the stem tip until the central portion or point 56 engages the valve pin head, as at 35, Figure 3, and depresses the same so as to unseat the body 37. The clip will hold itself in this position, but is readily removable, by a reverse manipulation, when deflation is completed. It will be noted that the valve pin head has a top central countersink and this acts to center the clip. It also facilitates the manipulation of other fittings such as air hose chucks.

In Figures 4 and 5, reference numerals 42, 43 and 44 designate the parts of a three-part mold, the center part 43 having a cavity 44' of a shape to produce a stem such as is shown in Figures 1 and 3. The bottom member 44 of the mold has an opening 45 axially aligned with cavity 44', and mold member 42 carries a mold pin 46 in alignment with opening 45. A tubular fitting 45' is set in a counterbore at the upper end of opening 45 and projects into the mold cavity. The projecting portion of the fitting has a maximum external diameter, just above mold portion 44, which is substantially equal to the internal diameter of an insert 13 at the tip end of the latter, the extremity of the fitting being externally tapered upwardly from the point of said maximum diameter. In the use of the apparatus, an insert 13, for example, is placed in the bottom of the mold cavity with flange 15 on top, the insert being accurately centered by fitting 45' as shown in Figure 4. Pin 46 has a point 47 surmounted by a substantially cylindrical portion 48, which, in turn, is surmounted by a relatively abrupt conical shoulder 49. Customarily, the mass of rubber to be molded is formed with a hole therethrough and so placed over the mold cavity that the mold pin will pass through the hole. As mold portion 42 is moved toward portion 43 in the molding operation, point 47 enters the opening 15' of insert 13 and closes the same prior to the time the rubber mass reaches the insert.

As the molding proceeds, portion 48 of the pin enters the opening 15' and maintains the same closed. At the end of the operation, as shown in Figure 5, the conical shoulder 49 has slightly entered the opening 15' so that the pin is thereafter readily removed from the latter when the mold part 42 is moved away from part 43. It will be understood that the flange may also undergo a reaming or swaging operation and be somewhat deformed by the shoulder 49 during the molding operation. The tip of the insert has been pressed squarely against mold member 44 during the molding operation, and since the other end of the insert is closed by the mold pin, it is impossible for the plastic material to reach the interior of the insert. The opening 45 and fitting 45' provide clearance for the point of the mold pin and keep the pin in perfect alignment.

It will be understood that the new valve stem is not limited to production by the prescribed apparatus and that it may be varied in form and arrangement of details without departure from the scope of the invention as set forth in the following claims.

I claim:

1. A rubber valve stem comprising a rubber body portion having a longitudinal passage extending therethrough from base to tip, a tubular insert in the stem having a portion lining a portion of said passage, an annular seat formed of the body portion material and faced toward the base of said body portion, said insert having a portion backing said seat to resist distension of the latter, the outer end opening of said tubular insert being restricted, a movable valve body cooperable with said seat, a pin on said valve body extending toward the tip of said body portion, and a head on said pin substantially filling said restricted outer end opening to prevent ingress of foreign matter when said valve body is seated but being freely slidable in said restricted outer end opening so that said valve body may always assume a fully seated position without interference, said head being movable inwardly of said restricted outer end opening during inflation, and yieldable means for seating said valve body.

2. A rubber valve stem comprising a rubber body portion having a longitudinal passage extending therethrough from base to tip, a tubular insert in the stem having a portion lining the tip end of said passage, an annular seat formed of the body portion material and faced toward the base of said body portion, said insert having an inwardly extending annular flange, the outer end opening of said tubular insert being restricted, a movable valve body cooperable with said seat, a pin on said valve body extending toward the tip of said body portion, and a head on said pin substantially filling said restricted outer end opening to prevent ingress of foreign matter when said valve body is seated but being freely slidable in said restricted outer end opening so that said valve body may always assume a fully seated position without interference, said head being movable inwardly of said restricted outer end opening during inflation, and yieldable means between said flange and head for seating said valve body.

3. A rubber valve stem comprising a rubber body portion having a longitudinal passage extending therethrough from base to tip, a tubular insert in the stem having a portion lining the tip end of said passage, an annular seat formed of the body portion material and faced toward the base of said body portion, said insert having a portion backing said seat to resist distention of the latter, the outer end opening of said tubular insert being restricted, a movable valve body cooperable with said seat, a pin on said valve body extending toward the tip of said body portion, and a head on said pin substantially filling said restricted outer end opening to prevent ingress of foreign matter when said valve body is seated but being freely slidable in said restricted outer end opening so that said valve body may always assume a fully seated position without interference, said head being movable inwardly of said restricted outer end opening during inflation, and yieldable means between said insert backing portion and head for seating said valve body.

4. A rubber valve stem comprising a rubber body portion having a longitudinal passage extending therethrough from base to tip, a tubular insert in the stem having a portion lining the tip end of said passage, an annular seat formed of the body portion material adjacent the inner end of said insert and faced toward the base of said body portion, said insert having an inwardly directed flange at the inner end of said insert, the outer end opening of said tubular insert being restricted, a movable valve body cooperable with said seat, a pin on said valve body extending toward the tip of said body portion, and a head on said pin substantially filling said restricted outer end opening to prevent ingress of foreign matter when said valve body is seated but being freely slidable in said restricted outer end opening so that said valve body may always assume a fully seated position without interference, said head being movable inwardly of said restricted outer end opening during inflation, and yieldable means reacting between said flange and head for seating said valve body.

5. A rubber valve stem comprising a rubber body portion having a longitudinal passage extending therethrough from base to tip, a tubular insert in the stem having a portion lining the tip end of said passage, an annular seat formed of the body portion material and faced toward the base of said body portion, the outer end opening of said tubular insert being restricted, a movable valve body cooperable with said seat, a pin on said valve body extending toward the tip of said body portion, and a head on said pin substantially filling said restricted outer end opening to prevent ingress of foreign matter when said valve body is seated but being freely slidable in said restricted outer end opening so that said valve body may always assume a fully seated position without interference, said head being movable inwardly of said restricted outer end opening during inflation, and yieldable means for seating said valve body, said head being of a size to be passed through said annular seat and said yieldable means being disposed between the valve body and the base of the stem body.

6. A rubber valve stem comprising a rubber body having a longitudinal passage extending therethrough from base to tip, a tubular insert in the stem having a portion lining the tip end of said passage, the body material completely covering said insert circumferentially, and valve provisions in said passage; the body having externally a circumferential shoulder above the inner end of the insert, a cylindrical portion above said shoulder, and a circumferentially reduced portion extending between said cylindrical portion and the tip extremity.

7. A rubber valve stem comprising a rubber body portion having a longitudinal passage extending therethrough from base to tip, a tubular insert in the stem having a portion lining a portion of said passage, an annular seat formed of the body portion material and faced toward the base of said body portion, the outer end opening of said tubular insert being restricted, a movable valve body cooperable with said seat, a pin on said valve body extending toward the tip of said body portion, and a head on said pin for substantially closing said restricted outer end opening to prevent ingress of foreign matter when said valve body is seated but being freely slidable in said restricted outer end opening so that said valve body may always assume a fully seated position without interference, said head being movable inwardly of said restricted outer end opening during inflation.

8. A rubber valve stem comprising a rubber body portion having a longitudinal passage extending therethrough from base to tip, an annular seat of the body portion material formed in said passage and faced toward the base of the stem, a movable valve body cooperable with said seat, a relatively rigid annular member fixed in the body portion and having a portion in surmounting relation to the seat to support the latter, the opening defined by said annular member being smaller than said valve body so that the latter is unable to pass therethrough, and a compression spring bearing at one end against said annular member portion on its side opposite said seat and having its other end in connection with said valve body to normally yieldingly seat the latter.

9. A rubber valve stem comprising a rubber body portion having a longitudinal air passage extending therethrough from base to tip, a tubular insert in the stem having a portion lining the tip end of said passage, an annular seat formed of the body portion material and faced toward the base of said body portion, said insert having a portion backing said seat to resist distention of the latter, the outer end opening of said tubular insert being restricted, a movable valve body cooperable with said seat, said insert portion defining an opening smaller than said valve body, a pin on said valve body extending toward the tip of said body portion, and a head on said pin substantially filling said restricted outer end opening to prevent ingress of foreign matter when said valve body is seated but being freely slidable in said restricted outer end opening so that said valve body may always assume a fully seated position without interference, said head being movable inwardly of said restricted outer end opening during inflation, and yieldable means for seating said valve body.

10. A rubber valve stem comprising a rubber body portion having a longitudinal passage extending therethrough from base to tip, a tubular insert in the stem having a portion lining the tip end of said passage, said insert interiorly being flared from its tip toward the base of the stem whereby a restricted outer end opening and a subjacent outwardly tapering zone are provided, an anular seat formed of the body portion material and faced toward the base of said body portion, a movable valve body cooperable with said seat, a pin on said valve body extending toward the tip of said body portion, and a head on said pin substantially filling said restricted outer end opening to prevent ingress of foreign matter when said valve body is seated but being freely sliable in said restricted outer end opening so that said valve body may always assume a fully seated position without interference, said head being movable inwardly of said restricted outer end opening into said outwardly tapering zone during inflation, and yieldable means for seating said valve body.

11. A rubber valve stem comprising a rubber body portion having a longitudinal passage extending therethrough from base to tip, an insert in the stem having a portion lining the tip end of said passage, said insert interiorly being flared from its tip toward the base of the stem whereby a restricted outer end opening and a subjacent outward tapering zone are provided, an annular seat formed of the body portion material in said passage and at least in part surrounded by said insert, said insert including a seat-reenforcing portion which overlies said seat, a movable valve body cooperable with said seat, a pin on said valve body extending toward the tip of said body portion, a head on said pin substantially filling said restricted outer end opening to prevent ingress of foreign matter when said valve body is seated but being freely slidable in said restricted outer end opening so that said valve body may always assume a fully seated position without interference, said head being movable inwardly of said restricted outer end opening into said outwardly tapering zone during inflation, and yieldable means for normally seating said valve body.

12. An insert unit for a rubber valve stem, said unit comprising a tubular portion internally and externally tapered toward one end and having at the other end a conical circumferential shoulder and a terminal cylindrical skirt, and a fitting comprising a cylindrical skirt and a conical flange pressed with the skirt of said tubular portion so that said flange bears against said shoulder, said flange defining a central opening of less diameter than the internal diameter of said tubular portion at the top of said shoulder.

13. A flexible rubber tire valve stem having a longitudinal through passage cross-sectionally reduced intermediate its ends to provide a seat integral with the stem and faced toward the base of said stem, a movable valve head cooperble with said seat to close said passage, a movable closure member cooperating with the outer end of said passage for normally preventing the entrance of dust and water, means operatively connecting said valve head and closure member for transmitting movement of said closure member to said valve head and means providing for the passage of air by said closure member when said closure member is depressed.

14. A rubber tire valve stem having a longitudinal through passage cross-sectionally reduced intermediate its ends to provide a seat integral with the stem and faced toward the base of said stem, a movable valve head cooperable with said seat to close said passage, a relatively rigid annular member fixed in said valve stem and lining a portion of said passage and having its outer end adjacent the outer end of the stem, a movable closure member cooperating with the outer end of said member for normally preventing the entrance of dust and water, and means operatively connecting said valve head and closure member for transmitting movement of said closure member to said valve head, said annular member having a passage which is tapered to provide for the passage of air by said closure member when said closure member is depressed.

15. In combination, a tire valve comprising a flexible rubber stem portion having a metal insert molded in its outer end as a permanent part thereof, said valve stem being provided with a bore therethrough, means in said bore forming a valve seat, a valve cooperating with said seat to seal said bore and provided with a valve pin extending through said bore to adjacent the outer open end thereof, a spring acting to normally seat said valve, and a closure member mounted on the outer end of said valve pin directly in said metal insert and of a size such as to close the outer open end of said insert against the admission of dust and water when said valve is seated, said insert having a bore which is enlarged adjacent said closure member whereby air may pass around said closure member when said closure member is depressed.

16. In combination, a flexible rubber valve stem having a bore extending longitudinally therethrough, a valve seat formed on the wall of said bore, a valve cooperating with said seat, means for unseating said valve cooperating with said valve and extending longitudinally of said bore toward the outer open end thereof, a closure member for the outer open end of the bore to exclude the admission of dust and water and arranged for movement longitudinally of said bore and operatively associated with said valve unseating means, and means providing for the passage of air around said closure member on the depression thereof.

17. A flexible rubber tire valve stem having a longitudinal through passage cross sectionally reduced intermediate its ends and providing a seat integral with the stem and faced toward the base of said stem, a movable valve head cooperable with said seat to close said passage, a movable closure member cooperating with the outer end of said passage and normally preventing the entrance of dust and water, means operatively connecting said valve head and closure member for transmitting movement of said closure member to said valve head, and a tubular insert having a portion lining the outer end of said passage, said insert having its interior of increasing cross section away from the end occupied by said closure member to provide for the passage of air by said closure member when said closure member is depressed.

18. A valve stem comprising a rubber valve stem body having a longitudinal through passage cross sectionally reduced intermediate its ends to provide a shoulder faced toward the base of the stem, a movable valve body cooperable with said shoulder as a seat, a tubular metal insert lining the tip end of said passage and entirely covered circumferentially by the body material, a pin on said valve body and extending past said shoulder and within said insert, and a head on said pin slidably guided by the inner walls of said insert and serving to maintain said pin coaxial with said insert when said valve body is seated, said head substantially closing the outer end of said insert against the admission of dust and water when said valve body is seated.

19. A rubber valve stem comprising a rubber body portion having a longitudinal passage extending therethrough from base to tip, a tubular insert in the stem having a portion lining a portion of said passage, an annular seat formed of the body portion material and faced toward the base of said body portion, said insert including an internal flange portion, said flange portion backing said seat to resist distention of the latter, the outer end opening of said tubular insert being restricted, a movable valve body cooperable with said seat, a pin on said valve body extending toward the tip of said body portion, and a head on said pin substantially filling said restricted outer end opening to prevent ingress of foreign matter when said valve body is seated but being freely slidable in said restricted outer end opening so that said valve body may always assume a fully seated position without interference, said head being movable inwardly of said restricted outer end opening during inflation, and yieldable means for seating said valve body.

FRANK H. WATSON.